No. 865,676. PATENTED SEPT. 10, 1907.
D. W. BROWN.
ARTIFICIAL BAIT.
APPLICATION FILED MAR. 29, 1907.
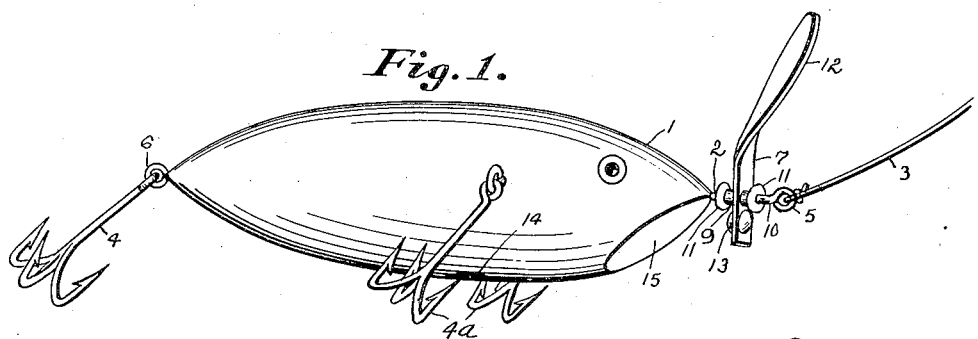
Fig. 1.
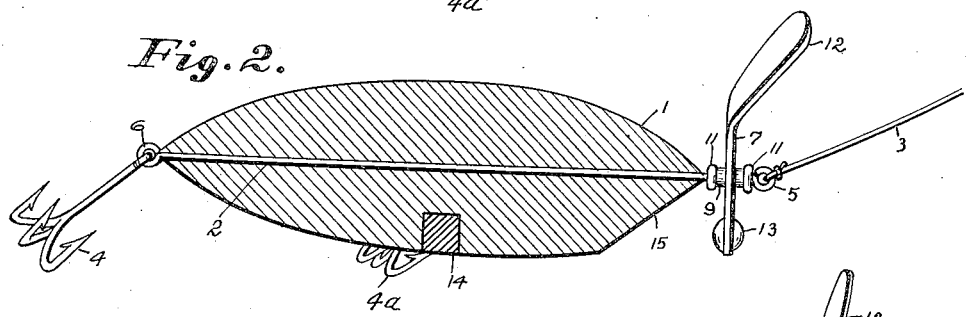
Fig. 2.
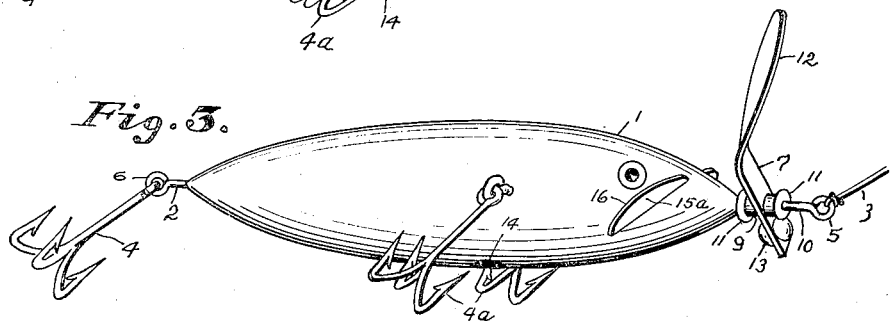
Fig. 3.
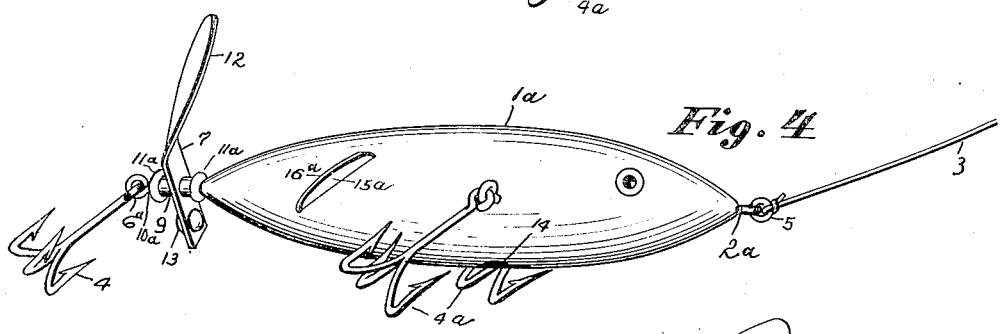
Fig. 4.
Fig. 5.
Fig. 6.
Witnesses
Harry O. Rastetter
Mary A. Cavanaugh
Inventor
Daniel W. Brown
By Harry Frease
Attorney.

UNITED STATES PATENT OFFICE.

DANIEL WEBSTER BROWN, OF YOUNGSTOWN, OHIO.

ARTIFICIAL BAIT.

No. 865,676.　　　Specification of Letters Patent.　　　Patented Sept. 10, 1907.

Application filed March 29, 1907. Serial No. 365,307.

*To all whom it may concern:*

Be it known that I, DANIEL WEBSTER BROWN, a citizen of the United States, residing at Youngstown, in the county of Mahoning and State of Ohio, have invented certain new and useful Improvements in Artificial Bait, of which the following is a specification.

This invention relates to a bait for catching fish and is illustrated as an artificial minnow adapted to be suspended in a current of water or to be drawn through the same on the end of a line; and the objects of the improvements are to provide means for causing the minnow to meander or wiggle laterally through the water in simulation of the movements of a natural minnow, without rotating on its axis or twisting the draft-line, and without any unnatural or undesirable upward and downward movements. These objects are attained by the construction, mechanism and arrangement illustrated in the accompanying drawing, in which—

Figure 1 is a perspective view, looking slightly underneath, of the minnow, showing the preferred form of the improvements thereon; Fig. 2, a longitudinal vertical section of the same; Fig. 3, a perspective view of the minnow showing a fin form of inclined facets; Fig. 4, a similar view showing the application of a one-paddle spinner on the rear end of the minnow; Fig. 5, a detached perspective view of the axial rod; and Fig. 6, a detached perspective view of the counter-weighted one-paddle spinner.

Similar numerals refer to similar parts throughout the drawing.

The body 1 of the artificial bait is preferably made, as illustrated, in the form of a small fish or minnow, and for convenience in attaching the necessary parts the axial rod 2 is preferably provided and securely attached longitudinally in the body of the minnow. The draft-line 3 and the rear hook 4 are attached to the eyes 5 and 6 formed respectively on the forward and rear ends of the axial rod.

The spinner 7 is rotatably mounted on the forward end of the minnow and, as shown, is journaled by means of the sleeve bearing 9 on the forward extension 10 of the axial rod, between the stop-collars 11 thereon. The paddle 12 is formed on one end of the spinner, and for the purposes of this invention this paddle is bent or inclined forward, and is also slightly inclined or twisted laterally so as to cause the rotation of the spinner by the movement of the minnow through the water or the flow of the water around the minnow. On the opposite end of the spinner with reference to its axis is provided a counter-balance, as the weight 13. By this peculiar construction and arrangement of a counter-weighted one-paddle spinner the minnow is caused to meander or wiggle through the water.

The ballast-weight 14 is provided in the belly of the minnow at or near its middle line, and this weight serves to steady the minnow in an upright position, and also to prevent, partially at least, any up and down movement of the minnow by reason of the rotation of the spinner. The downward-rearward inclined facet 15 is provided on the lower side of the forward end of the minnow and the presentation of this facet to the resistance or flow of the water tends to hold or deflect the forward end of the minnow slightly upward, thus overcoming the weight of the spinner and its counter-balance, and also assists in steadying the minnow against any upward and downward movement and prevents all tendency to a downward movement.

It will be noted that it is undesirable for the minnow to dart downward in the water on account of the liability of its becoming entangled in weeds and other submarine obstacles. It is also evident that downwardly and rearwardly inclined facets as $15^a$ can be provided on the sides of the body at or near its forward end by means of laterally disposed fins, as 16, in which event the body of the minnow can be formed symmetrical from front to rear. Furthermore it is evident that a counter-weighted one-paddle spinner can be applied to the rear end of the minnow, and in this event the fin form of facets can be provided on the sides of the minnow adjacent to the spinner, as shown in Fig. 4; but for obvious reasons the location of the spinner at the forward end of the bait is thought to be more efficient, and it is also more desirable because it removes the spinner entirely away from the hooks, and thus exposes the hooks more surely to the biting fish. The counter-weight on the spinner is not essential to the operation of the same but the use of the weight gives the spinner a more steady and positive action. Also, when the counter-weight is employed, some of the results attained by the forward inclined one-paddle spinner can be obtained by a rear-ward inclined one-paddle spinner, but the best results are secured with the forward inclined paddle. When the body is properly ballasted the downward-rearward inclined facets can be dispensed with. Additional hooks, as $4^a$, may be attached on the sides of the minnow.

What I claim as my invention, and desire to secure by Letters Patent, is—

1. An artificial bait comprising a ballasted body, a rotatable spinner on the forward end of the body composed of a forward-inclined paddle on one end and a counter weight on the other end, and a downward-rearward inclined facet on the forward part of the body.

2. An artificial bait comprising a ballasted body, a rotatable spinner on one end of the body composed of a forward-inclined paddle on one end and a counter weight on the other end, and a downward-rearward inclined facet on the adjacent part of the body.

3. An artificial bait comprising a ballasted body, a rotatable spinner on the forward end of the body composed of a paddle on one end and a counter weight on the other end, and a downward-rearward inclined facet on the forward part of the body.

4. An artificial bait comprising a ballasted body, a rotatable spinner on one end of the body composed of a paddle on one end and a counter weight on the other end, and a downward-rearward inclined facet on the adjacent part of the body.

5. An artificial bait comprising a ballasted body, a rotatable one-paddle spinner on the forward end of the body having its paddle inclined forward, and a downward-rearward inclined facet on the forward part of the body.

6. An artificial bait comprising a ballasted body, a rotatable one-paddle spinner on one end of the body having its paddle inclined forward, and a downward-rearward inclined facet on the adjacent part of the body.

7. An artificial bait comprising a ballasted body and a rotatable spinner on the forward end of the body composed of a forward-inclined paddle on one end and a counter weight on the other end.

8. An artificial bait comprising a ballasted body and a rotatable spinner on one end of the body composed of a forward-inclined paddle on one end and a counter weight on the other end.

9. An artificial bait comprising a ballasted body and a rotatable spinner on the forward end of the body composed of a paddle on one end and a counter weight on the other end.

10. An artificial bait comprising a ballasted body and a rotatable spinner on one end of the body composed of a paddle on one end and a counter weight on the other end.

11. An artificial bait comprising a ballasted body and a rotatable one-paddle spinner on the forward end of the body having its paddle inclined forward.

12. An artificial bait comprising a ballasted body and a rotatable one-paddle spinner on one end of the body having its paddle inclined forward.

13. In an artificial bait, a body and a rotatable spinner on the forward end of the body composed of a forward-inclined paddle on one end and a counter weight on the other end.

14. In an artificial bait, a body and a rotatable spinner on one end of the body composed of a forward-inclined paddle on one side and a counter weight on the other side.

15. In an artificial bait, a body and a rotatable spinner on the forward end of the body composed of a paddle on one end and a counter weight on the other end.

16. In an artificial bait, a body and a rotatable spinner on one end of the body composed of a paddle on one end and a counter weight on the other end.

17. In an artificial bait, a body and a rotatable one-paddle spinner on the forward end of the body having its paddle inclined forward.

18. In an artificial bait, a body and a rotatable one-paddle spinner on one end of the body having its paddle inclined forward.

DANIEL WEBSTER BROWN.

Witnesses:
  E. E. WRIGHT,
  ALLAN G. McGARRITY.